(12) United States Patent
Krishnamurthy et al.

(10) Patent No.: US 8,726,357 B2
(45) Date of Patent: May 13, 2014

(54) SYSTEM AND METHOD FOR TRACKING NETWORK TRAFFIC OF USERS IN A RESEARCH PANEL

(75) Inventors: Swaminathan Krishnamurthy, San Jose, CA (US); Robert On, Cupertino, CA (US); Elissa Lee, Santa Clara, CA (US); Shrikant Kelkar, Sunnyvale, CA (US); Hal R. Varian, Danville, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 13/538,976

(22) Filed: Jun. 29, 2012

(65) Prior Publication Data

US 2013/0007865 A1 Jan. 3, 2013

Related U.S. Application Data

(60) Provisional application No. 61/504,126, filed on Jul. 1, 2011.

(51) Int. Cl.
*H04L 29/06* (2006.01)

(52) U.S. Cl.
USPC .............................................. 726/7; 705/7.11

(58) Field of Classification Search
USPC ......................................... 726/7; 705/1, 7.11
See application file for complete search history.

(56) References Cited

U.S. PATENT DOCUMENTS

| 6,529,954 | B1 | | 3/2003 | Cookmeyer, II et al. |
| 8,259,722 | B1 | * | 9/2012 | Kharitonov ................... 370/392 |
| 2002/0199120 | A1 | * | 12/2002 | Schmidt ........................ 713/201 |
| 2004/0221033 | A1 | * | 11/2004 | Davis et al. ................... 709/224 |
| 2005/0271039 | A1 | * | 12/2005 | Boehmke ....................... 370/351 |
| 2008/0109902 | A1 | | 5/2008 | Grosse et al. |
| 2008/0126420 | A1 | * | 5/2008 | Wright et al. .............. 707/104.1 |
| 2009/0138593 | A1 | * | 5/2009 | Kalavade ...................... 709/224 |
| 2009/0262741 | A1 | * | 10/2009 | Jungck et al. ................. 370/392 |
| 2010/0312706 | A1 | * | 12/2010 | Combet et al. .................. 705/50 |
| 2012/0233152 | A1 | * | 9/2012 | Vanderwende et al. ...... 707/722 |

OTHER PUBLICATIONS

Google Inc., ISR/WO, PCT/US2012/045083, Jan. 22, 2013, 8 pgs.

* cited by examiner

*Primary Examiner* — Matthew Smithers
(74) *Attorney, Agent, or Firm* — Morgan, Lewis & Bockius LLP

(57) ABSTRACT

A system, computer-readable storage medium storing at least one program, and a computer-implemented method for tracking network traffic of users in a research panel are presented. A packet for a network device coupled to the network access device is received. An indicia corresponding to a presumptive user of the network device is obtained, where the presumptive user includes a member of a set of known users. One or more logging rules is applied to the network device, where the one or more applied logging rules correspond to the obtained indicia. Information relating to the packet is stored when the packet satisfies at least one of the logging rules applied to the network device.

29 Claims, 13 Drawing Sheets

User Identification

Please identify yourself as one of the following users.
Choose "Guest User" if you are not a member of this panel or do not wish to have your session tracked.
Choose "Register User" if you are a member of this panel, but are not listed on this page.

GUI 1600

- John
- Mary
- Peter (Minor)
- Alice (Minor)
- Guest User 1607
- Register User 1608

Figure 16A

GUI 1620

User Identification

Please identify yourself by providing your username and password.
Choose "Guest User" if you are not a member of this panel or do not wish to have your session tracked.
Choose "Register User" if you are a member of this panel, but are not listed on this page.

Name _____ 1621
Password _____ 1622
(optional)

( Guest User 1607 )

( Register User 1608 )

( Submit )  ( Cancel )

Figure 16B

Register User

Please provide the following information to register with the router.

Name _____ 1641

Password _____ 1642
(optional)

Age _____ 1643

Sex ☐ M  ☐ F  — 1644

Check box to opt into tracking  ☐ — 1645
network traffic for this user (Submit)  (Cancel)

GUI 1640

Figure 16C

Register Device

Please provide the following information to register your device with the router.

Select a user of the device (select all users of the device):

[ John ]  [ Mary ]  [ Peter (Minor) ]  [ Alice (Minor) ]  [ Guest User 1607 ]   — 1661

Select a device type (check all that apply):

☐ Single-user    ☐ Phone    ☐ Laptop    ☐ TV
   AND
☐ Multi-user     ☐ Tablet   ☐ Desktop   ☐ Game Console ☐ — 1662
Check box to opt into tracking
network traffic for this device ( Submit )   ( Cancel )

GUI 1660

Figure 16D

SYSTEM AND METHOD FOR TRACKING NETWORK TRAFFIC OF USERS IN A RESEARCH PANEL

RELATED APPLICATION

This application claims priority to U.S. Provisional Patent Application No. 61/504,126, filed Jul. 1, 2011, which is hereby incorporated by reference in its entirety.

TECHNICAL FIELD

The disclosed embodiments relate generally to techniques for tracking network traffic of users in a research panel.

BACKGROUND

Actions of users (or panelists) participating in a research panel may be correlated with demographic information for the users, which in turn may be extrapolated and applied to a general population. For example, websites that users in an Internet research panel visit may be associated with demographic information for the users. This demographic information may be used to determine a likelihood that a particular user having particular demographic characteristics will view a particular website, will click on a particular advertisement displayed on the particular website, and/or will purchase products and/or services related to the particular advertisement displayed on the particular website. Improved techniques for tracking websites or Internet locations that a user in an Internet research panel has visited, which are not burdensome to the user, are needed.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings.

FIG. 16A is an example, schematic screenshot of a graphical user interface for obtaining an indicia corresponding to a user of a network device, according to some embodiments.

FIG. 16B is an example, schematic screenshot of another graphical user interface for obtaining an indicia corresponding to a user of a network device, according to some embodiments.

FIG. 16C is a schematic screenshot of a graphical user interface for registering a new user, according to some embodiments.

FIG. 16D is a schematic screenshot of a graphical user interface for registering a new network device, according to some embodiments.

DESCRIPTION OF EXAMPLE EMBODIMENTS

Figure 1:
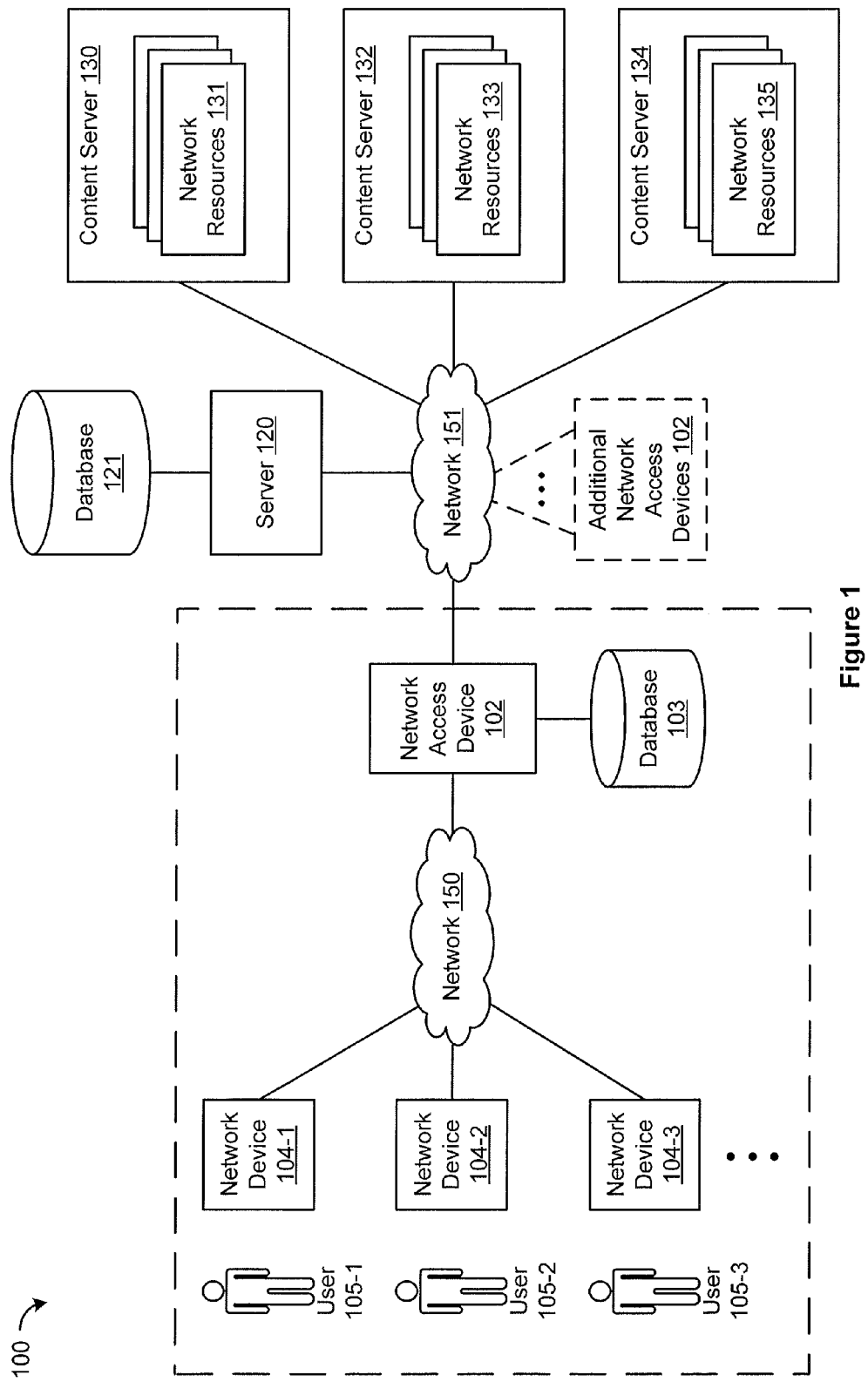
FIG. 1 is a block diagram illustrating a network system, according to some embodiments.

The description that follows includes example systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

As discussed above, actions of users (or panelists) participating in research panel (e.g., a marketing research panel, a television research panel, etc.) may be correlated with demographic information for the users, which in turn may be extrapolated and applied to a general population. Information relating to network traffic may be used to determine the actions of the users participating in the research panel and content associated with these actions. The network traffic generated by actions of the users typically includes requests and responses to requests to access network resources (e.g., videos, music, documents, storage resources, etc.) in a network system. For example, a user may use a network device (e.g., a laptop computer, desktop computer, smart phone, tablet, or other client device or system) to request a file from a content server. In this example, the network traffic typically includes request packets from the network device to the content server requesting the file and response packets from the content server to the network device including portions of the file. Similarly, the user may use the network device to upload a file to the content server. In this example, the network traffic typically includes request packets from the network device to the content server requesting to upload the file, response packets from the content server to the network device acknowledging the request to upload the file and/or providing further instructions to the network device (e.g., a destination IP address to which the file is to be uploaded), and packets from the network device to the content server including portions of the file.

Existing techniques for tracking (also herein called logging or logging and analyzing) traffic associated with actions of users (e.g., panelists in a research panel) are burdensome to the users. For example, tracking software (e.g., web tracking software) installed on a network device may be used to track network traffic for users of the network device. However, web tracking software is typically written for a particular operating system (OS) (e.g., Chromium OS, Windows, Mac OS, etc.), a particular OS version (e.g., Windows 7), a particular web browser (e.g., Google Chrome, Microsoft Internet Explorer, etc.), a particular web browser version, and/or the like. In systems using web tracking software, the web tracking software may become incompatible or require updates when the OS and/or web browser of the network device is updated or upgraded. Ensuring that web tracking software is current and compatible may cause unnecessary burden to the user of the network device. Also, installing web tracking software to multiple network devices (e.g., it would not be unusual for a single user to use a laptop computer, smart phone, tablet, and desktop computer) is labor intensive. Furthermore, users may fall out of compliance when the users purchase a new network device or upgrade the OS and/or the web browsers on the network device. These factors may lead to structural biases in the tracking of the network traffic.

In another example, cookies generated by a web browser on a network device may be tracked. Although tracking cookies do not place a burden on the user of the network device, cookies are each associated with a range of URLs (e.g., the URLs for a particular website), and it is therefore impractical to use tracking cookies to track all network traffic by a user.

In yet another example, a proxy server may be used to track network traffic. However, a proxy server requires configuring each network device to be tracked so as to route network traffic through the proxy server. To ensure that the user experience is not negatively affected, the proxy server must be designed to have low latency and be reliable. Furthermore, configuring multiple network devices can be labor intensive for the user. These requirements make it difficult to produce a cost-effective proxy server that may be used to track network traffic.

To overcome the aforementioned deficiencies of the existing techniques, in some embodiments, a network access device is used to track information relating to network traffic of network devices for users in a network system. In some implementations, the network access device is a router that is installed in a home (or office) of a user or a group of users. The network access device provides, to a set of network devices, access to network resources (e.g., websites on the Internet). By using a network access device to track information relating to network traffic of network devices of users, the users do not need to install and/or maintain (e.g., upgrade and/or update) tracking software on the network devices. Moreover, network traffic from multiple network devices in the same home or office can be tracked, subject to additional requirements (e.g., consent by the users). These embodiments are described in more detail below with reference to FIGS. 1-16.

FIG. 1 is a block diagram illustrating a network system 100, according to some embodiments. The network system 100 includes a network access device 102 coupled to network 150 and network 151. In some embodiments, the network access device 102 is a router (e.g., a wireless and/or wired router) that routes network traffic (or otherwise provides network connectivity) between computer systems coupled to network 150 (e.g., network devices 104) and computer systems coupled to network 151 (e.g., a server 120, content servers 130, 132, and 134). Network 150 is typically a local area network or intranet; network 151 is typically the Internet or other wide area network. More generally, networks 150 and 151 can generally include any type of wired or wireless communication channel capable of coupling together computing nodes. This includes, but is not limited to, a local area network (LAN), a wide area network (WAN), or a combination of networks.

In some embodiments, the network access device 102 is coupled to (or includes) a database 103. In some implementations, database 103 includes data for users known to the network access device 102, data for network devices 104 (e.g., laptop computers, desktop computers, smart phones, tablets, and/or other client devices or systems) known to the network access device 102, logging rules for users and/or network devices known to the network access device 102, and/or information relating to packets for the network devices coupled to the network 150. The users known to the network access device 102 may include users whose network devices have previously used the network access device 102 to access computer systems on network 151, users that have been registered (e.g., by an administrator of the network access device 102, by the users themselves, etc.) with the network access device 102, and users that are registered with the server 120. The network devices known to the network access device 102 typically include network devices that have previously connected to the network access device 102, and network devices that have been registered (e.g., by an administrator of the network access device 102, by users of the network devices, etc.) with the network access device 102 and/or registered with the server 120. The logging rules for users and/or network devices known to the network access device 102 specify the conditions under which information related to requests to access network resources are to be stored or not stored. The information relating to a packet (i.e., the information to be stored in database 103, if the logging rules allow such information to be stored) typically includes several, but typically not all of the following: a device identifier (e.g., a MAC address) for the network device associated with the packet, an identifier of a household (or office) associated with the user, a network address associated with the packet (e.g., an IP address), a uniform resource locator (URL) associated with the packet, a network protocol associated with the packet (e.g., HTTP, FTP, gopher, etc.), a query string associated with the packet, a port associated with the packet, a file type (e.g., an image file, a movie file, an audio file, a text file, a cookie file, an advertisement, etc.) associated with the packet, a timestamp of the packet, at least a portion of an envelope (or header) of the packet (e.g., source IP address, destination IP address, time-to-live (TTL), etc.) at least a portion of the payload of the packet (e.g., the data or the content of the packet), and a user identifier of a user (e.g., a name of the user, a username of the user, an alphanumeric identifier of the user, etc.) associated with the packet. Note that the payload may include data such as an advertisement identifier, key-value pairs, cookies, video identifiers, video advertisements, and/or portions of a file (e.g., an image file, an audio file, a video file, a text file, etc.). In some implementations, the information relating to a packet is not stored in database 103, but instead is temporarily stored (or buffered) in memory for network access device 102 and transmitted to server 120 in real time or at predetermined intervals.

Network devices 104 for users 105 are coupled (e.g., wired and/or wirelessly) to the network access device 102 via network 150. A respective network device 104 is typically a laptop computer system, a desktop computer system, a mobile phone, a smartphone, a personal digital assistant, a tablet computer system, a set top box, a game console, or other client device or system. Each network device may be associated with one or more unique identifiers. For example, a unique identifier for a network device may include a Media Access Control (MAC) address of the network device, an International Mobile Equipment Identity (IMEI) number, an Internet Protocol (IP) address assigned to the network device by the network access device 102, and a physical location of the network device (e.g., as determined by a satellite positioning system such as GPS).

As illustrated in FIG. 1, in some implementations, the network access device 102 and the network devices 104 interconnected by a private network (e.g., a LAN). For example, in some implementations, the private network is a home network or a network for a business (e.g., network 150).

The network system 100 may include a server 120 coupled to network 151. In some implementations, server 120 receives and analyzes information relating to packets received from a plurality of network access devices (e.g., the network access device 102) in the network system 100. For example, in some implementations server 120 analyzes the information relating to packets received from a plurality of network access devices to determine trends in network traffic by particular demographic groups (e.g., women between the ages of 20 and 30 watching a particular television program at a particular time, etc.). In some implementations, server 120 also provides logging rules, data for users, and/or data for network devices to corresponding network access devices in the plurality of network access devices. For example, in some implementations server 120 provides logging rules for users 105 (e.g., the users of network access devices 102), logging rules for network devices 104 (e.g., the network device coupled to the network access device 102), and/or data for the users 105, and/or data for the network devices 104.

In some embodiments, the server 120 is coupled to (or includes) a database 121. In some implementations, database 121 includes data for users known to the server 120, data for network devices known to the server 120, logging rules for users and/or network devices known to the server 120, and/or information relating to packets for the network devices coupled to network access devices (e.g., the network access device 102). The users known to the server 120 typically include users whose network devices have previously used any of the network access devices known to the server 120 to access computer systems on network 151, users that have been registered (e.g., by an administrator of the server 120, by an administrator of a network access device, by the users themselves, etc.) with the server 120, and users that are registered with a network access device 102 in the plurality of network access devices known to server 120. The network devices known to the server 120 typically include network devices that have previously connected to any of the network access device 102 known to server 120, network devices that have been registered (e.g., by an administrator of the server 120, by an administrator of a network access device, and/or by users of the network devices, etc.) with the server 120, and/or network devices that are registered with a network access device in the plurality of network access devices known to server 120. The logging rules for users and/or network devices known to the server 120 typically specify conditions in which information related to requests to access network resources are to be stored or not stored. The information relating to packets may include information relating to packets received from the network access device 102.

The network system 100 typically includes content servers 130, 132, and 134, respectively. Content servers 130, 132, and 134 provide network resources 131, 133, and 135, respectively, to (i.e., for access by) network devices 104. A network resource may include a file hosted on a respective content server (e.g., a webpage, an image file, a video file, an audio file, a text file, a document, a presentation file, etc.). The network resource may also include a storage resource provided by the content server. For example, the network resource may be a photo storage website that allows users to upload and store photos on a content server hosting the network resource.

Network system 100 typically includes multiple network access devices coupled to network 151, where a respective network access device provides, to network devices 104 coupled to the respective network access device, access to network 151 and thereby provides access to network resources via network 151.

Also note that although FIG. 1 illustrates one server (e.g., the server 120), the network system 100 may include any number of servers. In some implementations, server 120 includes a plurality of servers. The plurality of servers may provide load balancing, provide low-latency points of access to nearby computer systems, and/or perform different subsets of the functions associated with server 120. For example data analysis may be performed by different servers than servers that collect data from network access devices; optionally, the servers provide logging rules and user/device to network access devices are different servers than the servers that collect data from network access devices. The servers may be located within a single location (e.g., a data center, a building, etc.) or may be geographically distributed across multiple locations (e.g., data centers at various geographical locations, etc.).

Furthermore, note that although FIG. 1 illustrates three content servers (e.g., the content servers 130, 132, and 134), the network system 100 may include any number of content servers coupled to network 151 (and typically provides access to millions of content servers).

Also note that although the embodiments described herein refer to network access device 102, network devices 104, server 120, and content servers 130, 132, and 134, the embodiments described herein may be applied to any number of network access devices, network devices, servers, and content servers. Furthermore, the functionality of server 120 and content servers 130, 132, and 134 may be implemented within a single server or a set of distributed servers. For example, server 120 and content server 130 may be located on the same server (or the same set of distributed servers).

Figure 2:
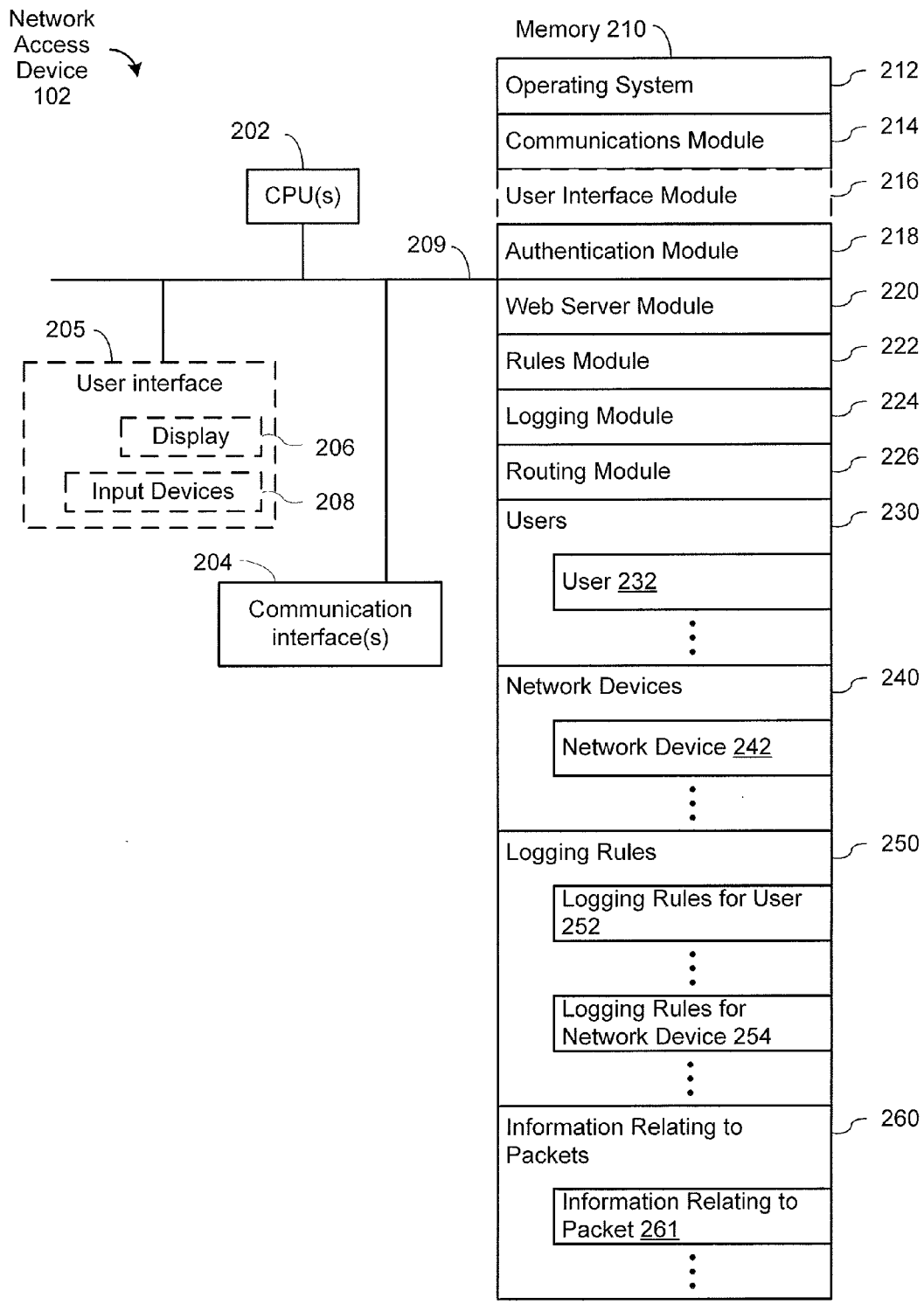
FIG. 2 is a block diagram illustrating a network access device, according to some embodiments.

FIG. 2 is a block diagram illustrating the network access device 102, according to some embodiments. The network access device 102 typically includes one or more processing units (CPU's, sometimes called processors) 202 for executing programs (e.g., programs stored in memory 210), one or more network or other communications interfaces 204, memory 210, and one or more communication buses 209 for interconnecting these components. The communication buses 209 may include circuitry (sometimes called a chipset) that interconnects and controls communications between system components. The network access device 102 optionally includes (but typically does not include) a user interface 205 comprising a display device 206 and input devices 208 (e.g., keyboard, mouse, touch screen, keypads, etc.). Memory 210 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 210 optionally includes one or more storage devices remotely located from the CPU(s) 202. Memory 210, or alternately the non-volatile memory device(s) within memory 210, comprises a non-transitory computer readable storage medium. In some embodiments, memory 210 or the computer readable storage medium of memory 210 stores the following programs, modules and data structures, or a subset thereof:

- an operating system 212 that includes procedures for handling various basic system services and for performing hardware dependent tasks;
- a communication module 214 that is used for connecting the network access device 102 to other computers (e.g., the network devices 104, the server 120, the content servers 130, 132, and 134, etc.) via the one or more communication interfaces 204 (wired or wireless) and one or more communication networks, such as the Internet, other wide area networks, local area networks, metropolitan area networks, and so on;
- an optional user interface module 216 that receives commands from a user via the input devices 208 and generates user interface objects in the display device 206;
- an authentication module 218 that registers new users and obtains indicia of known users of network devices (e.g., the network devices 104) coupled to the network access device 102;
- a web server module 220 that provides user interfaces (e.g., one or more of the user interfaces shown in FIGS. 16A-16D) and responds to requests for managing the network access device 102, managing users of the network access device 102, and/or managing devices coupled to the network access device 102;
- a rules module 222 that applies logging rules to network devices and/or users;
- a logging module 224 that logs information relating to packets associated with users in accordance with the applied logging rules;
- a routing module 226 that provides network devices on a first network (e.g., network 150) access to network resources on a second network (e.g., network 151);
- data 230 for a plurality of users, including data 232 for a respective user, where the data for the a user may include a name of the user, an age of the user, a sex of the user, an indication as to whether the user has opted into tracking (also herein called logging or logging and analyzing) packets associated with the user, and the like;
- data 240 for network devices, including data 242 for a respective network device 104, where the data for a network device may include data identifying one or more users of the network device, a type of the network device (e.g., single-user device, multi-user device, laptop, desktop, phone, TV, etc.), indication as to whether the network device has been opted into tracking packets associated with the network device, an identifier for the network device, and the like;
- logging rules 250, including logging rules 252 for a respective user and/or logging rules 254 for a respective network device, where a respective logging rule may specify conditions in which information related to packets are to be stored or are not to be stored, as described herein; and
- logged information relating to packets 260, including information 261 relating to a respective packet.

In some embodiments, the programs or modules identified above correspond to sets of instructions for performing a function described above. The sets of instructions can be executed by one or more processors (e.g., the CPUs 202). The above identified modules or programs (i.e., sets of instructions) need not be implemented as separate software programs, procedures or modules, and thus various subsets of these programs or modules may be combined or otherwise re-arranged in various embodiments. In some embodiments, memory 210 stores a subset of the modules and data structures identified above. Furthermore, memory 210 may store additional modules and data structures not described above.

Although FIG. 2 shows a "network access device," FIG. 2 is intended more as functional description of the various features which may be present in a network access device than as a structural schematic of the embodiments described herein. In practice, and as recognized by those of ordinary skill in the art, items shown separately could be combined and some items could be separated.

Figure 3:
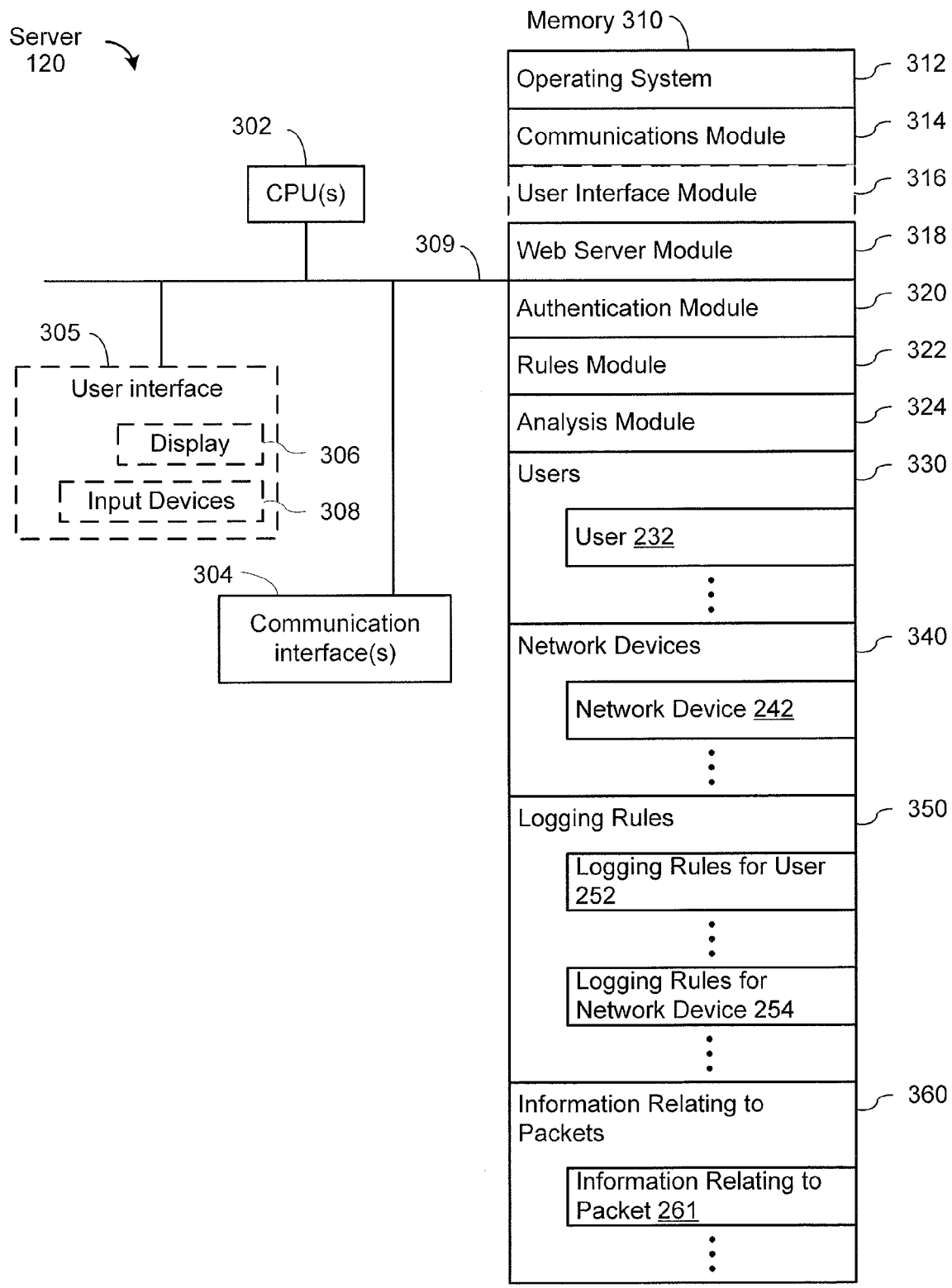
FIG. 3 is a block diagram illustrating a server, according to some embodiments.

FIG. 3 is a block diagram illustrating the server 120, according to some embodiments. The server 120 typically includes one or more processing units (CPU's, sometimes called processors) 302 for executing programs (e.g., programs stored in memory 310), one or more network or other communications interfaces 304, memory 310, and one or more communication buses 309 for interconnecting these components. The communication buses 309 may include circuitry (sometimes called a chipset) that interconnects and controls communications between system components. The server 120 optionally includes (but typically does not include) a user interface 305 comprising a display device 306 and input devices 308 (e.g., keyboard, mouse, touch screen, keypads, etc.). Memory 310 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 310 optionally includes one or more storage devices remotely located from the CPU(s) 302. Memory 310, or alternately the non-volatile memory device(s) within memory 310, comprises a non-transitory computer readable storage medium. In some embodiments, memory 310 or the computer readable storage medium of memory 310 stores the following programs, modules and data structures, or a subset thereof:

- an operating system 312 that includes procedures for handling various basic system services and for performing hardware dependent tasks;
- a communication module 314 that is used for connecting the server 120 to other computers (e.g., the network devices 104, the network access device 102, the content servers 130, 132, and 134, etc.) via the one or more communication interfaces 304 (wired or wireless) and one or more communication networks, such as the Internet, other wide area networks, local area networks, metropolitan area networks, and so on;
- an optional user interface module 316 that receives commands from a user via the input devices 308 and generates user interface objects in the display device 306;
- a web server module 318 that provides user interfaces and responds to requests for data for users 330, data for network devices 340, logging rules 350, information relating to packets 360 sent or received by network devices in the network system 100, and the like;
- an authentication module 320 that registers new users and provides indicia of known users of network devices (e.g., the network devices 104) to network access devices (e.g., a respective network access device 102);
- a rules module 322 that manages logging rules of network devices and/or users in the network system 100;
- an analysis module 324 that analyzes information relating to packets associated with users, stored in accordance with the applied logging rules, to identify correlations between information relating to the packets associated with the users and demographic characteristics of the corresponding users;
- data 330 for a plurality of users, including data 232 for a respective user, where a user in the plurality of users may be associated with a particular network device coupled to a particular network access device of the plurality of network access devices (in network system 100) known to server 120;
- data 340 for network devices, including data 242 for a respective network device, where a network device may be coupled to a particular network access device of the plurality of network access devices (in network system 100) known to server 120;
- logging rules 350, including logging rules 252 for a respective user and logging rules 254 for a respective network device, where a respective logging rule may include a logging rule for a user and/or a network device associated with a particular network of the plurality of network access devices (in network system 100) known to server 120; and
- information 360 relating to packets, including information 261 relating to a respective packet, where information relating to a packet may include information relating to a packet received by a particular network access device of the plurality of network access devices (in network system 100) known to server 120.

The above identified programs or modules correspond to sets of instructions for performing functions described above. The sets of instructions can be executed by one or more processors (e.g., the CPUs 302) of server 120. The above identified modules or programs (i.e., sets of instructions) need not be implemented as separate software programs, procedures or modules, and thus various subsets of these modules may be combined or otherwise re-arranged in various embodiments. In some embodiments, memory 310 stores a subset of the modules and data structures identified above. Furthermore, memory 310 may store additional modules and data structures not described above.

Although FIG. 3 shows a "server," FIG. 3 is intended more as functional description of the various features which may be present in a server than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers and how features are allocated among them will vary from one implementation to another, and may depend in part on the amount of data traffic that the system must handle during peak usage periods as well as during average usage periods.

Figure 4:
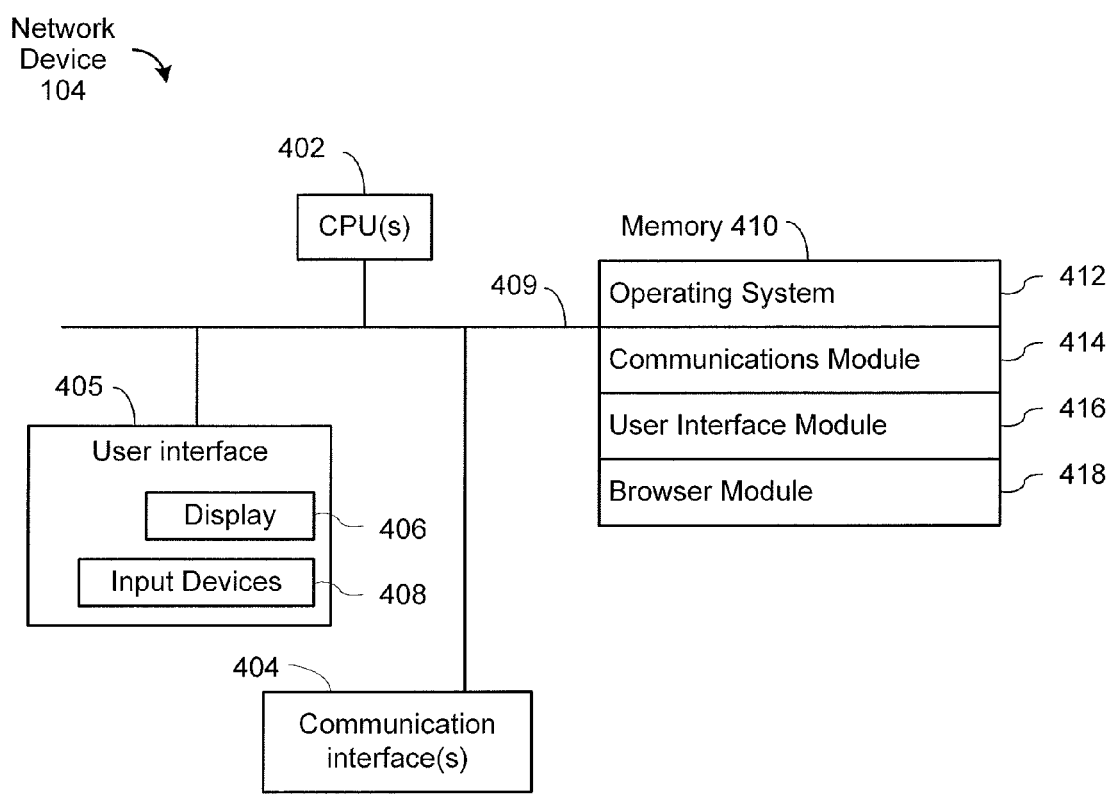
FIG. 4 is a block diagram illustrating a network device, according to some embodiments.

FIG. 4 is a block diagram illustrating a network device 104, according to some embodiments. The network device 104 typically includes one or more processing units (CPU's) 402, one or more network or other communications interfaces 404, memory 410, and one or more communication buses 409 for interconnecting these components. The communication buses 409 may include circuitry (sometimes called a chipset) that interconnects and controls communications between system components. Network device 104 typically includes a user interface 405 comprising a display device 406 and input devices 408 (e.g., keyboard, mouse, touch screen, keypads, etc.). Memory 410 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 410 optionally includes one or more storage devices remotely located from the CPU(s) 402. Memory 410, or alternately the non-volatile memory device(s) within memory 410, comprises a non-transitory computer readable storage medium. In some embodiments, memory 410 or the computer readable storage medium of memory 410 stores the following programs, modules and data structures, or a subset thereof:

- an operating system 412 that includes procedures for handling various basic system services and for performing hardware dependent tasks;
- a communication module 414 that is used for connecting network device 104 to other computers (e.g., the network access device 102, server 120, the content servers 130, 132, and 134, etc.) via the one or more communication interfaces 404 (wired or wireless) and one or more communication networks, such as the Internet, other wide area networks, local area networks, metropolitan area networks, and so on;

a user interface module 416 that receives commands from a user via the input devices 408; user interface module 416 optionally controls the display of network resources, user interfaces (e.g., user interfaces and network resources rendered by browser module 418) and the like on display device 406; and a browser module 418 that processes requests by a user of the network device 104 for network resources by obtaining the network resource, rendering the network resource for display, and the like.

The modules or programs identified above correspond to sets of instructions for performing functions described above. The sets of instructions can be executed by one or more processors (e.g., the CPUs 402) of network device 104. The above identified modules or programs (i.e., sets of instructions) need not be implemented as separate software programs, procedures or modules, and thus various subsets of these modules may be combined or otherwise re-arranged in various embodiments. In some embodiments, memory 410 may store a subset of the modules and data structures identified above. Furthermore, memory 410 may store additional modules and data structures not described above.

Although FIG. 4 shows a "network device," FIG. 4 is intended more as functional description of the various features which may be present in a network device than as a structural schematic of the embodiments described herein. In practice, and as recognized by those of ordinary skill in the art, items shown separately could be combined and some items could be separated.

Tracking Network Traffic of Users in a Research Panel

Figure 5:
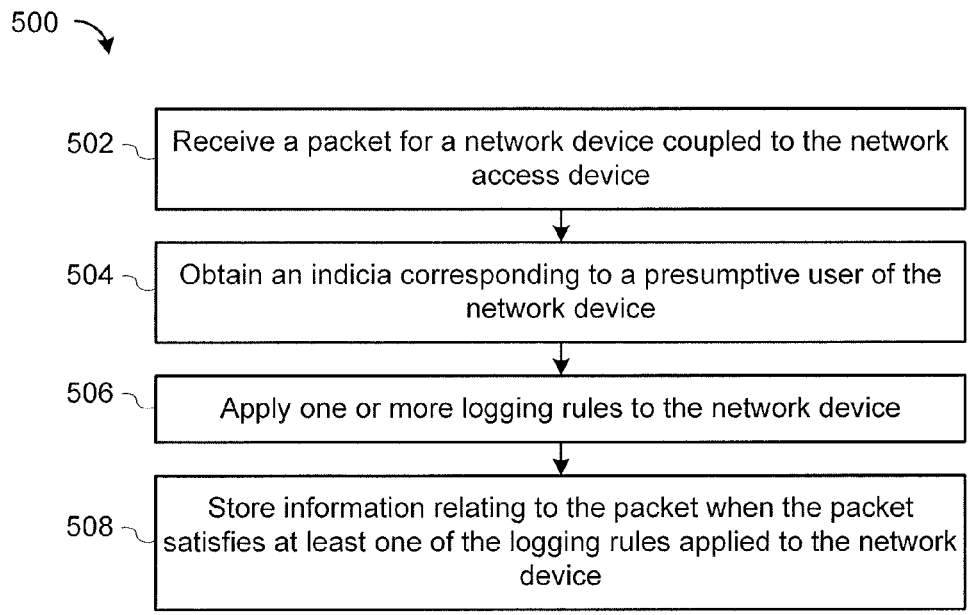
FIG. 5 is a flowchart of a method for tracking network traffic of users in a research panel, according to some embodiments.

FIG. 5 is a flowchart of a method 500 for tracking network traffic of users in a research panel, according to some embodiments. The communication module 214 receives (502) a packet for a network device (e.g., the network device 104-1) coupled to the network access device 102. Note that the packet for a network device may be a packet transmitted from the network device or a packet transmitted to the network device.

The authentication module 218 obtains (504) an indicia corresponding to a presumptive user of the network device, where the presumptive user includes a member of a set of known users. In some implementations, the set of known users includes users who have registered or have previously used network access device 102. In other implementations, the set of known users are users who have registered for the research panel and are, therefore, known or registered with server 120. Note that in some instances, the presumptive user of the network device is the actual user of the network device and in other instances, the presumptive user of the network device is not the actual user of the network device (e.g., due to a misidentification of the user, due to dishonesty of the user, etc.). In most implementations, such "other instances" rarely if ever occur. Operation 504 is described in more detail with reference to FIGS. 6-8.

The rules module 222 applies (506) one or more logging rules to the network device (i.e., to the packet), where the one or more applied logging rules correspond to the obtained indicia. In some embodiments, the one or more logging rules includes one or more of: a rule indicating that information related to packets for a presumptive user who has opted into storing information related to packets are to be stored, a rule indicating that information related to packets for a network device that has been opted into storing information related to packets are to be stored, a rule indicating that information related to packets associated with a file having a predetermined file type are to be stored, a rule indicating that information related to packets associated with a file having a file type that is not an excluded file type are to be stored, a rule indicating that information related to packets directed to a predetermined port are to be stored, a rule indicating that information related to packets directed to a port that is not an excluded port are to be stored, a rule indicating that information related to packets directed to a predetermined protocol are to be stored, a rule indicating that information related to packets directed to a predetermined protocol that is not an excluded protocol are to be stored, a rule indicating that information related to packets from a predetermined source IP address (or URL) are to be stored, a rule indicating that information related to packets from a predetermined source IP address (or URL) that is not an excluded IP address (or URL) are to be stored, a rule indicating that information related to packets destined for a predetermined destination IP address (or URL) are to be stored, a rule indicating that information related to packets destined for a predetermined destination IP address (or URL) that is not an excluded IP address (or URL) are to be stored, a rule indicating that predetermined portions of envelopes of packets (e.g., source IP address, destination IP address, time-to-live (TTL), etc.) are to be stored, a rule indicating that predetermined portions of payloads of packets (e.g., portions of the data or the content of the packet) are to be stored, and a predefined logical combination of two or more of said rules. Thus, for example, if the logging rule includes a rule indicating that information related to packets to and/or from a user who has opted into storing information related to packets are to be stored, this rule is applied to the network device. Accordingly, this logging rule is applied to packets for the network device (e.g., packets sent to or sent by the network device).

Optionally, the logging rules may be used to blacklist particular websites, services, or webpages for privacy reasons. For example, the following types of websites, services, or webpages may be blacklisted: online banking websites, financial institution websites, communication websites or services (e.g., email, instant messaging, video messaging, and voice messaging websites), checkout webpages on online shopping websites.

In some implementations, the logging module 224 stores (508) information relating to the packet when the packet satisfies at least one of the logging rules applied to the network device. In some implementations, the logging module 224 stores (508) information relating to the packet when the packet satisfies a predefined logical combination of the logging rules applied to the network device. Continuing the example from above, if the presumptive user has opted into storing the information related to packets, the applied logging rule is satisfied and the logging module 224 stores the information related to the packet. In some embodiments, the logging module 224 stores the information relating to the packet in memory (or a buffer) on the network access device 102 and transmits the information relating to the packet to the server 120.

In some embodiments, logging module 224 prevents information relating to the packet from being stored when the logging rule applied to the network device is not satisfied. Continuing the example from above, if the presumptive user has not opted in to storing the information related to packets, or has opted out, the applied logging rule is not satisfied and logging module 224 prevents the information related to the packet from being stored. For example, packets for users who have agreed to be panelists and have signed an agreement that includes the user's consent to storing the information related to the packets, are stored so long as the applicable logging rules are satisfied, regardless of which network device they are using, so long as they are identified as the presumptive user of the network device to or from which the packet is being sent.

In some embodiments, logging module 224 prevents information relating to the packet from being stored when the logging rule applied to the network device specifies that information corresponding to the packet is not to be stored. Continuing the example from above, if the logging rule includes a rule indicating that information related to packets to and from the presumptive user are not to be stored, the logging module 224 prevents the information related to the packet from being stored. For example, packets for users who are minors or who have not agreed to be panelists and have not signed a consent agreement, are not stored, so long as they are identified as the presumptive user of the network device to or from which the packet is being sent.

In some embodiments, logging module 224 prevents information relating to the packet from being stored when the logging rule applied to the network device indicates that information relating to packets from the network device are not to be stored.

In some embodiments, logging module 224 receives updated logging rules from server 120. For example, when a new panelist opts in, or a former panelist cancels his/her agreement to be a panelist, server 120 sends updated logging rules to the corresponding network access device.

In some embodiments, authentication module 218 receives updated data 340 for network devices from server 120. In one example, the updated data concerns a network device associated with a new panelist. In another example, the updated data concerns a network device associated with a former panelist. In yet another example, the update data concerns a change in status of a network device from single user device to multi-user device, or vice versa.

In some embodiments, the authentication module 218 receives updated data 330 for users from server 120. In one example, the updated data 330 for users concerns additional users who have opted in for logging information related to packets, users who have opted out of logging information related to packets, and/or newly identified users who have not opted in for logging information related to packets.

In some embodiments, the logging module 224 transmits the information relating to the packet to server 120. The logging module 224 may transmit the information relating to the packets in real-time, or periodically, or when a triggering condition (e.g., when the quantity logged data reaches a pre-defined threshold, or when the time elapsed since the last transmission of logging data to server 120) occurs.

The information relating to the packet for the network device may be transmitted to server 120 via a message. In some implementations, the message includes the following fields: a timestamp field including a date and/or time that the message is sent to the server 120, a user identifier field including an identifier for a user to whom the packet corresponds, and a payload field. In some implementations, the payload field include one or more records, where each record corresponds to a packet. In some implementations, each record includes the following fields: a timestamp including a date and/or time that the packet was received by the network access device 102, a URL field including a URL associated with the packet, a content type field including to a content type of the packet (e.g., a mime type, such as text, html, etc.), a header field including request headers for the packet, a response field including a response, and a referrer field including a URL that caused the packet to be generated. An example message that includes information related to multiple packets for a network device is provided below:

```
{ "apiVersion" : "v1",
    "method" : "wmbe.webmeteringrecords.insert",
    "params" : { "resource" : { "records" : [
                { "requestHeaders" : [ "AAA",
                                       "BBB",
                                       "CCC"
                  ],
                  "timestamp" : "222",
                  "url" : "http://www.google.com"
                },
                { "requestHeaders" : [ "AAA",
                                       "BBB",
                                       "CCC"
                  ],
                  "timestamp" : "223",
                  "url" : "http://www.facebook.com/someuser"
                },
                { "requestHeaders" : [ "AAA",
                                       "BBB",
                                       "CCC"
                  ],
                  "timestamp" : "224",
                  "url" : "http://www.engadget.com/some/article"
                },
                { "requestHeaders" : [ "AAA",
                                       "BBB",
                                       "CCC"
                  ],
                  "timestamp" : "225",
                  "url" : "http://www.imdb.com"
                } ],
          "timestamp" : "999",
          "userId" : { "householdId" : "222",
                       "panelId" : "TEST",
                       "panelistId" : "111"
                     }
    } },
}
```

Obtaining Indicia Corresponding to the Presumptive User

In some embodiments, authentication module 218 obtains the indicia corresponding to the presumptive user in one of several ways, depending on whether the network device is a single-user device (e.g., a personal cell phone, a personal smartphone, a personal laptop, etc.) or a multi-user device (e.g., a television set top box, a family computer system, etc.).

Figure 6:
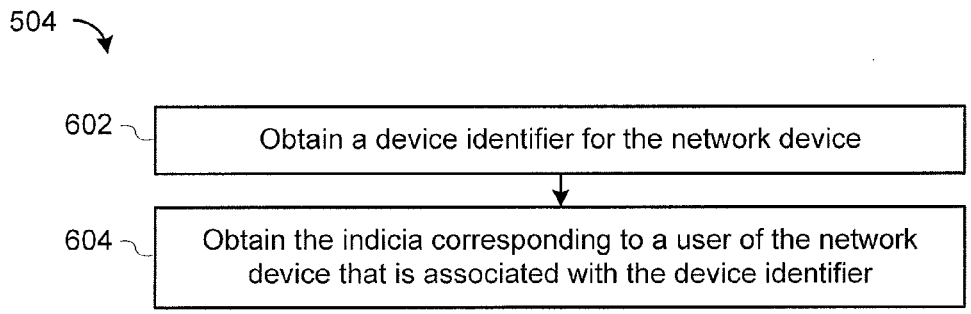
FIG. 6 is a flowchart of a method for obtaining an indicia corresponding to a presumptive user of a single-user network device, according to some embodiments.

Typically, some network devices are single-user devices. FIG. 6 is a flowchart of a method for obtaining (504) an indicia corresponding to a presumptive user of a single-user network device, according to some embodiments. Authentication module 218 obtains (602) a device identifier for the network device. For example, the authentication module 218 may obtain a MAC address of the network device.

The authentication module 218 then obtains (604) the indicia corresponding to a user of the network device that is associated with the device identifier. In some implementations, continuing the example from above, authentication module 218 obtains the indicia corresponding to the user of the single-user network device that has the MAC address.

Figure 7:
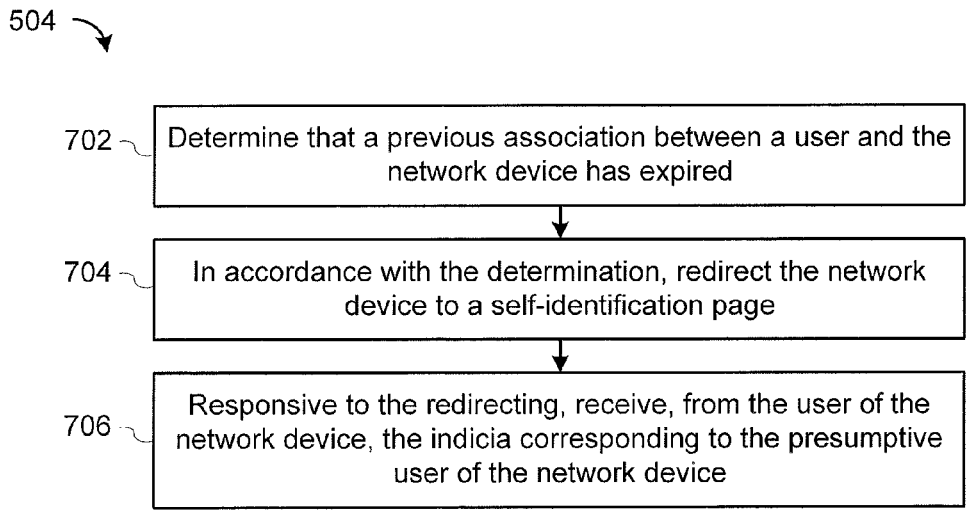
FIG. 7 is a flowchart of a method for obtaining an indicia corresponding to a presumptive user of a multi-user network device when a previous association between a user and the multi-user network device has expired, according to some embodiments.

Typically, some network devices are multi-user devices. Since a multi-user device may be used by one of a set of users, authentication module 218 does not assume that a single user is the presumptive user of the multi-user device. For example, a family computer system is typically used by multiple family members, and authentication module 218 obtains the indicia of the corresponding presumptive user in a different way than for a single-user network device. FIG. 7 is a flowchart of a method for obtaining (504) an indicia corresponding to a presumptive user of a multi-user network device when a previous association between a user and the multi-user network device has expired, according to some embodiments. The authentication module 218 determines (702) that a previous association between a user and the network device has expired. The network device may have been associated with a previous presumptive user from a previous session. In some implementations, the previous association between a user and the network device expires in the following situations: when the elapsed time since previous association and a current time exceeds a predetermined threshold, when network device is determined to have been rebooted, when the network access device 102 has been rebooted, when the network device is determined to have resumed from a sleep or hibernation mode, when the network access device 102 assigns a new IP address to the network device, or when the network access device 102 invalidates the IP address assigned to the network device in response to the network device requesting verification (e.g., periodically) from the network access device 102 that the IP address assigned to the network device is still valid.

In accordance with the determination (702), authentication module 218 redirects (704) the network device to a self-identification page, where the self-identification page requests a user of the network device to provide an indicia corresponding to the presumptive user of the network device. In some implementations, the self-identification page requests the user self-identify, without requesting a password or other verification data. In some other implementations, the self-identification page includes a login page that requests a password or other verification data. Examples of self-identification pages are illustrated in FIGS. 16A and 16B, according to some embodiments. FIG. 16A illustrates a graphical user interface (GUI) 1600 that includes a set of known users (e.g., John, Mary, Peter, Alice, and a guest user 1607). The set of known users is typically associated with known users of the network access device 102 (e.g., a network access device for a home or an office). In this example, John and Mary are adults, whereas Peter and Alice are minors. In some embodiments, minors are automatically opted out of logging their associated packets. Thus, logging rules for minors may indicate that information related to packets associated with the minors are not to be stored. The adults John and Mary may opt into or opt out of having their associated packets (e.g., network traffic) logged and analyzed. For example, assume that Mary has opted out of having her associated packets logged and John has opted into having his associated packets logged and analyzed. Accordingly, logging rules Mary indicate that information related to packets associated with Mary are not to be stored and logging rules for John indicate that information related to packets associated with John are to be stored. The guest user 1607 is typically used for guests of the home or office, who are not participants in a research panel, but who may desire to use the network access device 102 to access network 151. Optionally, GUI 1600 also includes a register user 1608 option to allow a new user or participant in a research panel to register with the network access device 102. The register user 1608 option is described in more detail with reference to FIGS. 9, 10, and 16C.

FIG. 16B illustrates a GUI 1620 that includes text input boxes 1621 and 1622 that allow a user to provide a name and, optionally, a password, respectively. GUI 1620 also includes the guest user 1607 option and the register user 1608 option.

In some implementations, if the user selects the register user 1608 option, the authentication module presents a user interface for registering a new user. FIG. 16C is a schematic screenshot of a GUI 1640 for registering a new user, according to some embodiments. In this example, GUI 1640 includes text input boxes 1641, 1642, and 1643 that allow a new user to provide a name, a password (if required by the system), and an age, respectively. Optionally, GUI 1640 also includes check boxes 1644 that allow the new user to provide the sex of the new user. Optionally, GUI 1640 also includes a checkbox 1645 that allows the new user to specify that the new user opts into having information relating to packets (network traffic) associated with the new user logged and analyzed.

Returning to FIG. 7, responsive to the redirecting, the authentication module 218 receives (706), from the user of the network device, the indicia corresponding to the presumptive user of the network device. For example, the user may have self-identified as "John" using GUI 1600 in FIG. 16A. Alternatively, the user may have provided a name "John" using GUI 1620 in FIG. 16B.

Figure 8:
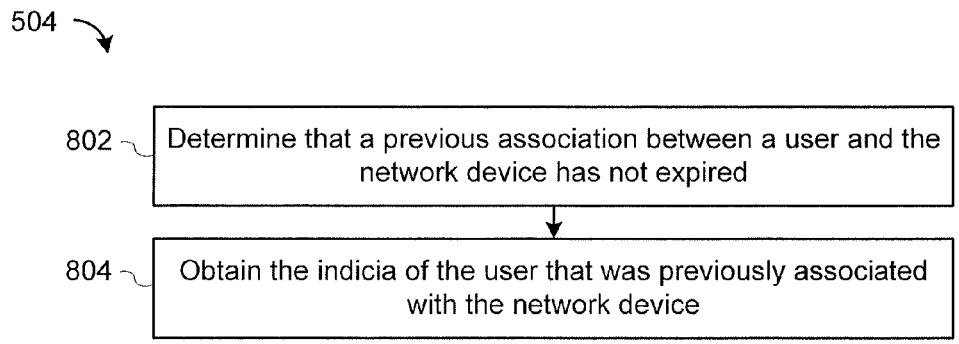
FIG. 8 is a flowchart of another method for obtaining an indicia corresponding to a presumptive user of a multi-user network device when a previous association between a user and the multi-user network device has not expired, according to some embodiments.

FIG. 8 is a flowchart of a method for obtaining (504) an indicia corresponding to a presumptive user of a multi-user network device when a previous association between a user and the multi-user network device has not expired, according to some embodiments. The authentication module 218 determines (802) that a previous association between a user and the network device has not expired and obtains (804) the indicia of the user that was previously associated with the network device. For example, if John was the previous user of the network device and the association between John and the network device has not expired, the authentication module obtains the indicia of John (e.g., a user identifier for John). Stated another way, in accordance with a determination that the association between a presumptive user and the network device has not expired, the authentication module obtains the indicia of that presumptive user.

New Network Devices

Figure 9:
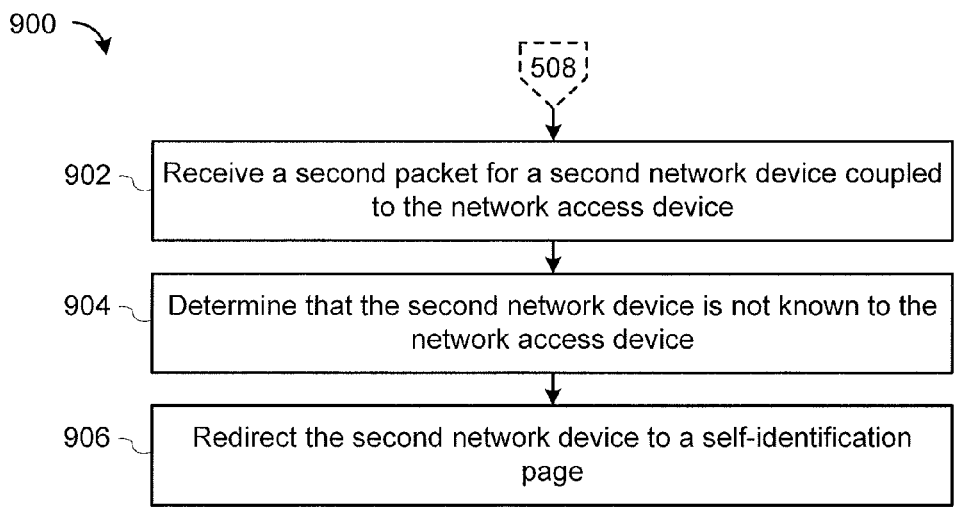
FIG. 9 is a flowchart of a method for handling a request from an unknown network device, according to some embodiments.

When the network access device 102 is first installed in a home (or an office), the network access device 102 may not have knowledge of network devices in the home (or the office). Furthermore, unknown network devices may use the network access device 102 in order to access network 151. For example, an unknown network device may be a new network device for a member of the home (or the office). Similarly, the unknown network device may be a network device for a guest of the home (or the office). FIG. 9 is a flowchart of a method 900 for handling a request from an unknown network device, according to some embodiments. Note that method 900 may be a continuation of the method 500 illustrated in FIG. 5. Alternatively or additionally, method 900 may operate independently of the method 500 illustrated in FIG. 5. For example, method 900 may be performed during an initial configuration operation or may be performed when a new device is detected on network 150.

Communication module 214 receives (902) a packet for a second network device (e.g., the network device 104-2) coupled to the network access device 102. The authentication module 218 determines (904) that the second network device is not known to the network access device 702 and redirects (906) the second network device to a self-identification page, where the self-identification page requests a user of the second network device to provide an indicia corresponding to a presumptive user of the second network device. In one example, operation 902 occurs when the second network device requests an IP address from the network access device.

Figure 10:
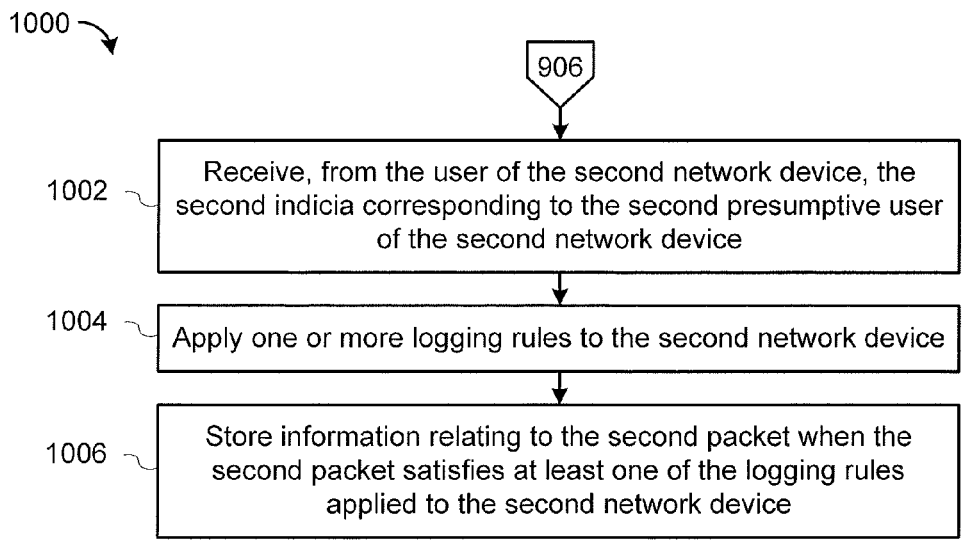
FIG. 10 is a flowchart of another method for tracking network traffic of users in a research panel, according to some embodiments.

FIG. 10 is a flowchart of a method 1000 for tracking network traffic of users in a research panel, according to some embodiments. FIG. 10 continues the method illustrated in FIG. 9. Authentication module 218 receives (1002), from the user of the second network device, the indicia corresponding to the presumptive user of the second network device. The rules module 222 applies (1004) one or more logging rules to the second network device, where the one or more applied logging rules correspond to the obtained indicia. Logging module 224 stores (1006) information relating to the packet for the second network device when the packet satisfies at least one of the logging rules applied to the second network device. In some implementations, logging module 224 stores (106) information relating to the packet when the packet satisfies a predefined logical combination of the logging rules applied to the network device.

Figure 11:
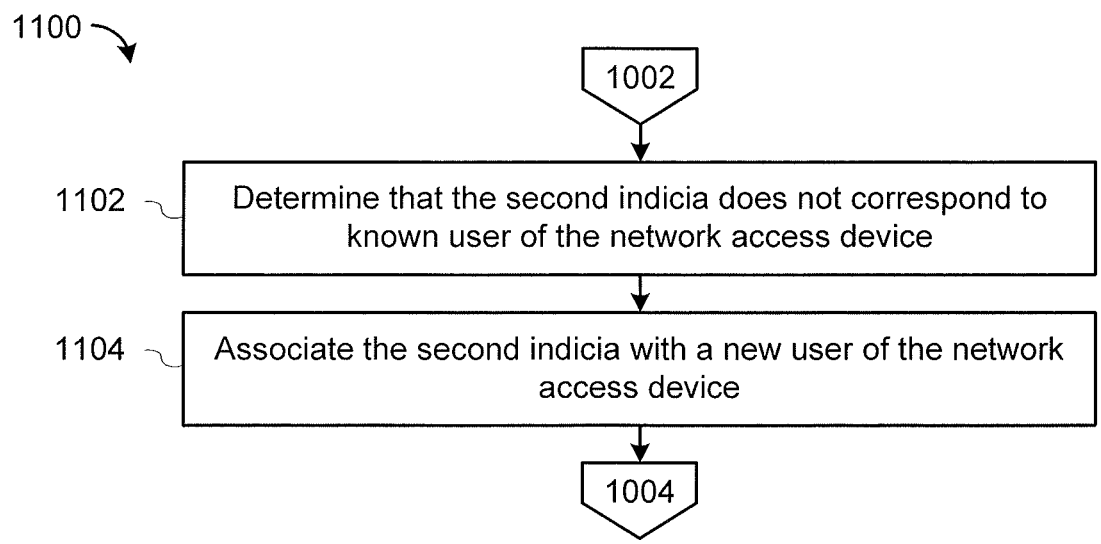
FIG. 11 is a flowchart of a method for associating a new user with a network device, according to some embodiments.

FIG. 11 is a flowchart of a method 1100 for associating a new user with a network device, according to some embodiments. In some implementations, method 1100 is performed between operations 1002 and 1004 in FIG. 10. Authentication module 218 determines (1102) that the indicia does not correspond to a known user of the network access device and associates (1104) the indicia with a new user of the network access device.

Figure 12:
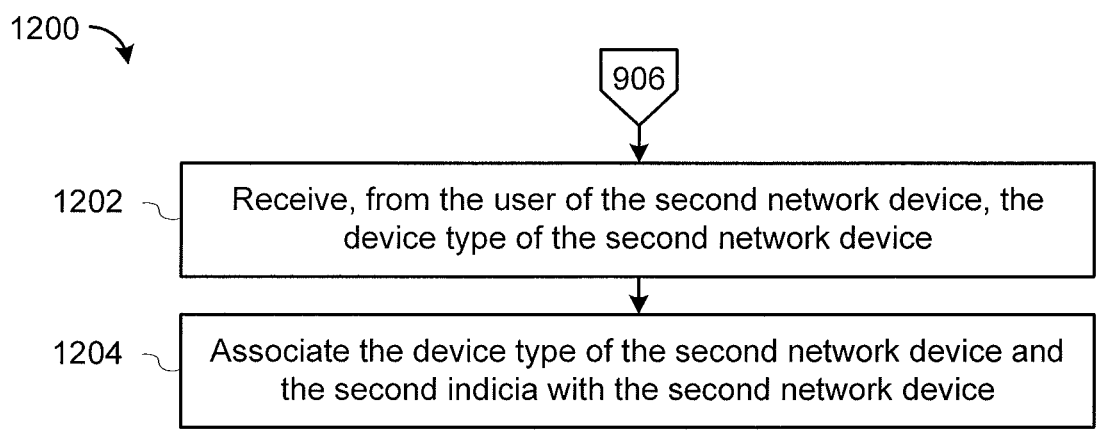
FIG. 12 is a flowchart of a method for associating a device type and a user with a network device, according to some embodiments.

In some embodiments, the self-identification page discussed above with respect to operation 906 further requests the user of the second network device to identify a device type of the second network device. FIG. 12 is a flowchart of a method 1200 for associating a device type and a user with a network device, according to some embodiments. In some implementations, method 1200 is performed after operation 906 in FIG. 9. Authentication module 218 receives (1202), from the user of the second network device, the device type of the second network device and associates (1204) the device type of the second network device and the indicia for the user of the second network device with the second network device. As discussed above, in some implementations, the device type of a network device indicates that the device is either a single-user device or a multi-user device.

FIG. 16D is a schematic screenshot of a GUI 1660 for registering a new network device, according to some embodiments. In some implementations, GUI 1660 presents a plurality of known users and a guest user 1607 option that the user may select as being associated with the new network device. In some implementations, GUI 1660 also presents a plurality of device types 1661 that may be associated with the network device. For example, the plurality of device types 1661 may allow the user to specify that the network device is a single-user device or a multi-user device. The plurality of device types 1661 may also allow the user to specify that the network device is a phone, a tablet computer system, a laptop computer system, a desktop computer system, a television, a game console, or the like. In some implementations, GUI 1660 also includes a checkbox 1662 that allows the user to specify that the user opts into having information relating to packets (network traffic) associated with the new network device logged and analyzed.

Example User Experience

The following discussion provides an example user experience. When a panelist household (or office) is recruited into a research panel, a network access device (e.g., router, Wi-Fi access point) is provided to the panelist household. The network access device may include the functionality discussed above with reference to FIGS. 1-16. When the network access device is coupled to a wide area network (e.g., via a DSL modem, via a cable modem, etc.) the user may couple (wired or wirelessly) network devices for the household to the network access device. When the user uses one of the network devices to access the WAN for the first time, the network access device redirects the user to a new user registration page (e.g., the user registration page illustrated in FIG. 16C) so that the user may identify individuals in the household who are panelists and individuals in the household who are not panelists (e.g., minors). Alternatively, when the panelist registers to become a panelist, information about all the individuals in the household may be collected, and server 120 may load that user information to the network access device for the household.

Once the panelists have been identified, the network devices are configured. When a network device connects to the network access device for the first time, the network device is redirected to a device registration page (e.g., the device registration page illustrated in FIG. 16D). The device registration page may ask the user to answer the following questions:

Is the device a multi-user device or a single-user device?
Who is (are) the user(s) of the network device?
Optionally, the device registration page asks the user whether information related to the packets for the network device are to be tracked.

If the information related to the packets for the network device is to be tracked (i.e., stored by the network access device and provided to server 120), the user may be asked to identify a location of the network device in the household. If the network device is to be excluded from the research study, logging rules to be applied to the network device indicate that the information related to the packets for the network device are not to be stored.

As discussed above, a user of the single-user device (e.g., a device used exclusively or mostly by a single user) need only self-identify as a user of the single-user device once. After the initial identification, a mapping between an identifier for the single user device and the user is used to identify the user of the single-user device. On the other hand, a user for a multi-user device may be asked to self-identify under certain conditions, such as, at the beginning of a browsing session and/or at periodic time intervals after the start of the browsing session.

Other Embodiments

Figure 13:
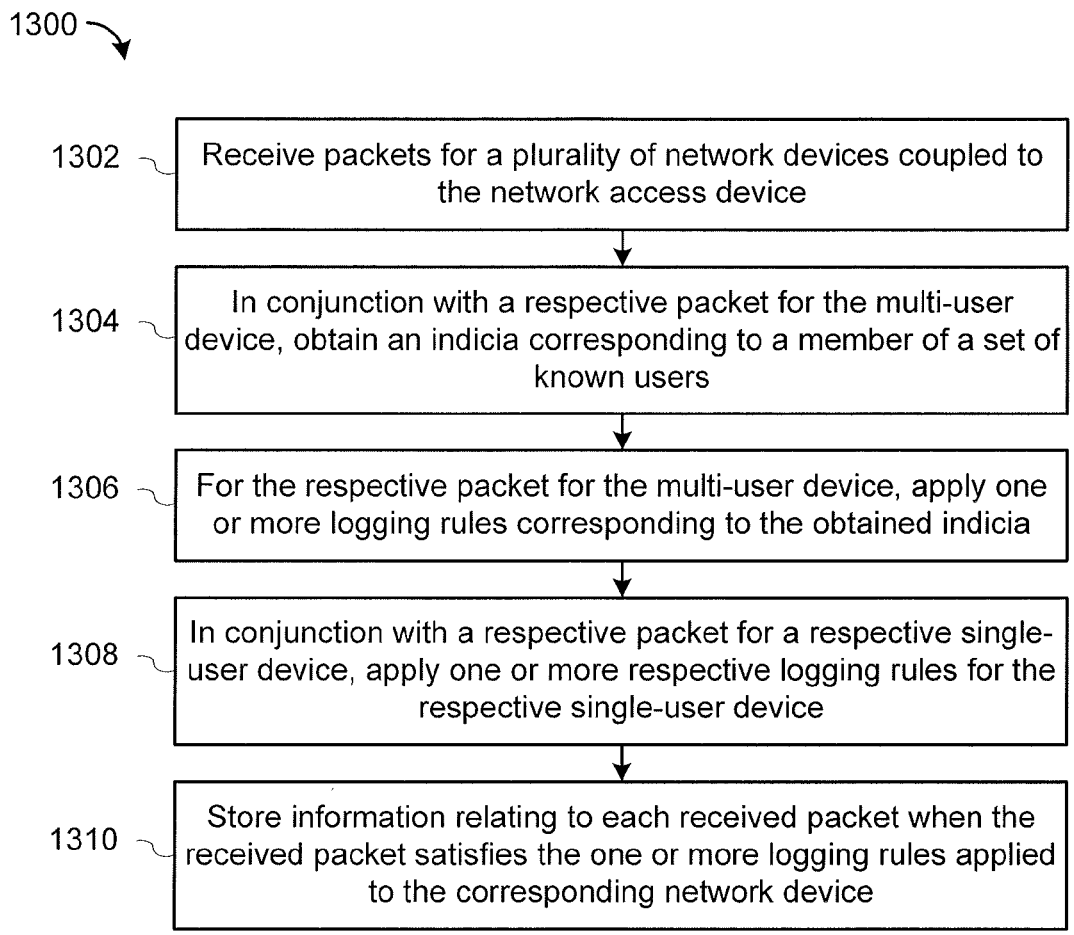
FIG. 13 is a flowchart of another method for tracking network traffic of users in a research panel, according to some embodiments.

FIG. 13 is a flowchart of a method 1300 for tracking network traffic of users in a research panel, according to some embodiments.

Communication module 214 receives (1302) packets for a plurality of network devices coupled to the network access device 102, where the plurality of network devices includes a plurality of single-user devices including at least a first single-user device associated with a registered user, and a multi-user device. For example, network device 104-1 may be the first single-user device, network device 104-2 may be a second single-user device, and network device 104-3 may be the multi-user device.

In conjunction with a respective packet for the multi-user device, the authentication module 218 obtains (1304) an indicia corresponding to a member of a set of known users. Continuing the example from above, authentication module 218 obtains the indicia corresponding to a user from the set of known users associated with the network device 104-3 (e.g., the multi-user device). Operation 1304 is described in more detail with reference to FIG. 14.

For the respective packet for the multi-user device, the rules module 222 applies (1306) one or more logging rules corresponding to the obtained indicia.

In conjunction with a respective packet for a respective single-user device, module 222 applies (1308) one or more respective logging rules for the respective single-user device;

the applied one or more respective logging rules correspond to a respective user associated with the respective single-user device.

Logging module 224 stores (1310) information relating to each received packet when the received packet satisfies the one or more logging rules (or a predefined combination of logging rules) applied to the corresponding network device. Stated another way, in accordance with a determination that a received packet satisfies the one or more logging rules (or a predefined combination of logging rules) applied to the corresponding network device, logging module 224 stores (1310) information relating to the received packet.

In some embodiments, for a respective received packet for a respective network device, the logging module 224 prevents information relating to the respective received packet from being stored when the one or more logging rules applied to the respective network device are not satisfied. Stated another way, in accordance with a determination that the one or more logging rules (or a predefined combination of logging rules) applied to the corresponding network device are not satisfied, logging module 224 prevents information relating to the received packet from being stored.

In some embodiments, for a respective received packet for a respective network device, the logging module 224 prevents information relating to the respective received packet from being stored when the one or more logging rules (or the predefined combination of logging rules) applied to the respective network device specify that information corresponding to the respective received packet is not to be stored. Stated another way, in accordance with a determination that the one or more logging rules (or a predefined combination of logging rules) applied to the corresponding network device specify that information corresponding to the respective received packet is not to be stored, the logging module 224 prevents information relating to the respective received packet from being stored.

In some embodiments, for a respective received packet from the first single-user device, logging module 224 prevents information relating to the respective received packet from being stored. For example, logging module 224 prevents information relating to the respective received packet from being stored when the user corresponding to the first single-user device has not opted in for logging packets associated with the user of the first single-user device.

In some embodiments, for a respective received packet from the second single-user device, the logging module 224 prevents information relating to the respective received packet from being stored. For example, logging module 224 prevents information relating to the respective received packet from being stored when the user corresponding to the second single-user device has not opted in for logging packets associated with the user of the second single-user device.

In some circumstances, for a respective received packet from the multi-user device, the logging module 224 prevents information relating to the respective received packet from being stored. For example, logging module 224 prevents information relating to the respective received packet from being stored when the presumptive user corresponding to the multi-user device has not opted in for logging packets associated with that user, or when logging of the respective received packet is blocked by a logging rule (or a predefined combination of logging rules) in accordance with a type or content of the respective received packet.

Figure 14:
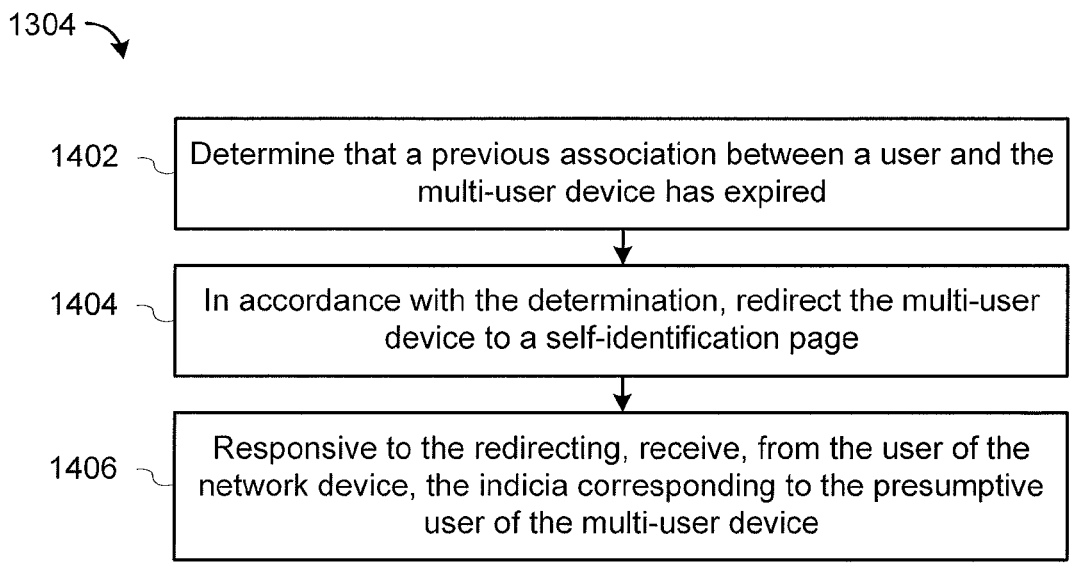
FIG. 14 is a flowchart of a method for obtaining an indicia corresponding to a known user of a multi-user device when a previous association between a user and the multi-user network device has expired, according to some embodiments.

FIG. 14 is a flowchart of a method for obtaining (1304) an indicia corresponding to a known user of a multi-user device when a previous association between a user and the multi-user network device has expired, according to some embodiments. The authentication module 218 determines (1402) that a previous association between a user and the multi-user device has expired. In accordance with the determination, the authentication module 218 redirects (1404) the multi-user device to a self-identification page, where the self-identification page requests a user of the network device to provide the indicia corresponding to a presumptive user of the multi-user device. Responsive to the redirecting, authentication module 218 receives (1406) the indicia from the multi-user device, where the indicia corresponds to the presumptive user of the multi-user device.

Figure 15:
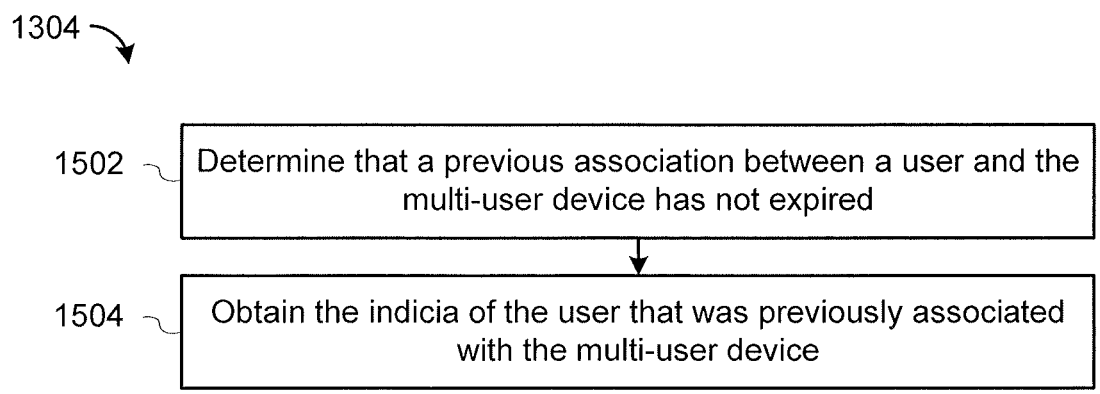
FIG. 15 is a flowchart of another method for obtaining an indicia corresponding to a known user of a multi-user device when a previous association between a user and the multi-user network device has not expired, according to some embodiments.

FIG. 15 is a flowchart of a method for obtaining (1304) an indicia corresponding to a known user of a multi-user device when a previous association between a user and the multi-user network device has not expired, according to some embodiments. Authentication module 218 determines (1502) that a previous association between a user and the multi-user device has not expired and obtains (1504) the indicia of the user that was previously associated with the multi-user device.

In some embodiments, the self-identification page is used to present questions to the user. For example, the self-identification page may present questions related to a product or service. Similarly, survey questions related to the research panel may be presented to the user via the self-identification page. This information may be transmitted from the network access device 102 to the server 120.

The methods illustrated in FIGS. 5-15 may be governed by instructions that are stored in a computer readable storage medium and that are executed by one or more processors of a respective network access device. Each of the operations shown in FIGS. 5-15 may correspond to instructions stored in a computer memory or non-transitory computer readable storage medium. In various implementations, the non-transitory computer readable storage medium includes a magnetic or optical disk storage device, solid state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

Certain embodiments are described herein as including instructions, logic, or a number of components, modules, or mechanisms. Modules may constitute either software modules (e.g., code or instructions embodied on a computer-readable storage medium) or hardware modules. A hardware module is a tangible unit capable of performing certain operations and may be configured or arranged in a certain manner. In some embodiments, one or more computer systems (e.g., the network access device 102, the server 120, etc.) or one or more hardware modules of a computer system (e.g., the processor 202 or a group of processors) may be configured by software (e.g., an application or application portion) as a hardware module that operates to perform certain operations as described herein.

In some embodiments, a hardware module may be implemented electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within the processor 202 or other programmable processor) that is temporarily configured by software to perform certain operations. It will be appreciated that the decision to implement a hardware module, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise the processor 202 configured using software, the processor 202 may be configured as respective different hardware modules at different times. Software may accordingly configure the processor 202, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors 202 that are temporarily configured (e.g., by software) or permanently configured to perform the relevant operations. Whether temporarily or permanently configured, such processors 202 may constitute processor-implemented modules that operate to perform one or more operations or functions. The modules referred to herein may, in some example embodiments, comprise processor-implemented modules.

Similarly, the methods described herein may be at least partially computer-implemented. For example, at least some of the operations of a method may be performed by one or more processors 202 or processor-implemented modules. The performance of certain of the operations may be distributed among the one or more processors 202, not only residing within a single machine, but deployed across a number of machines. In some example embodiments, the processors 202 may be located in a single location (e.g., within a home environment, an office environment or as a server farm), while in other embodiments, the processors 202 may be distributed across a number of locations.

Each of the methods described herein may be governed by instructions that are stored in a non-transitory computer readable storage medium and that are executed by one or more processors of one or more servers or clients. Each of the operations shown in FIGS. 5-15 may correspond to instructions stored in a computer memory or non-transitory computer readable storage medium.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the embodiment(s).

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A computer-implemented method for tracking network traffic of users in a research panel, performed on a network access device having at least one processor and memory storing at least one program for execution by the at least one processor to perform the method, comprising:
   receiving, at the network access device, a packet for a network device coupled to the network access device by a local area network;
   obtaining an indicia corresponding to a presumptive user of the network device, the presumptive user comprising a member of a set of known users of the network access device;
   applying, at the network access device, one or more logging rules to the packet for the network device, the one or more applied logging rules corresponding to the obtained indicia; and
   storing information relating to the packet in accordance with a determination, at the network access device, that the packet satisfies at least one of the logging rules applied to the packet for the network device.

2. The computer-implemented method of claim 1, wherein the method includes preventing information relating to the packet from being stored when the one or more logging rules applied to the network device are not satisfied.

3. The computer-implemented method of claim 1, wherein the method includes preventing information relating to the packet from being stored when the one or more logging rules applied to the network device specify that information corresponding to the packet are not to be stored.

4. The computer-implemented method of claim 1, wherein the network device is a single-user device, and wherein obtaining the indicia corresponding to the presumptive user of the network device includes:
   obtaining a device identifier for the network device; and
   obtaining the indicia corresponding to a user of the network device that is associated with the device identifier.

5. The computer-implemented method of claim 1, wherein the network device is a multi-user device, and obtaining the indicia corresponding to the presumptive user of the network device comprises:

determining that a previous association between a user and the network device has expired;

in accordance with the determination, redirecting the network device to a self-identification page, the self-identification page requesting a user of the network device to provide the indicia corresponding to the presumptive user of the network device; and responsive to the redirecting, receiving, from the user of the network device, the indicia corresponding to the presumptive user of the network device.

6. The computer-implemented method of claim 1, wherein the network device is a multi-user device, and wherein obtaining the indicia corresponding to the presumptive user of the network device includes:

determining that a previous association between a user and the network device has not expired; and obtaining the indicia of the user that was previously associated with the network device.

7. The computer-implemented method of claim 1, further including:

receiving a second packet for a second network device coupled to the network access device;

determining that the second network device is not known to the network access device; and redirecting the second network device to a self-identification page, the self-identification page requesting a user of the second network device to provide a second indicia corresponding to a second presumptive user of the second network device.

8. The computer-implemented method of claim 7, further including:

receiving, from the user of the second network device, the second indicia corresponding to the second presumptive user of the second network device;

applying one or more logging rules to the second network device, the one or more applied logging rules corresponding to the obtained second indicia; and storing information relating to the second packet when the second packet satisfies at least one of the logging rules applied to the second network device.

9. The computer-implemented method of claim 8, further including:

determining that the second indicia does not correspond to a known user of the network access device; and associating the second indicia with a new user of the network access device.

10. The computer-implemented method of claim 8, wherein the self-identification page further requests the user of the second network device to identify a device type of the second network device, and wherein the method further includes:

receiving, from the user of the second network device, the device type of the second network device; and associating the device type of the second network device and the second indicia with the second network device.

11. The computer-implemented method of claim 10, wherein the device type is selected from the group consisting of a multi-user device and a single-user device.

12. The computer-implemented method of claim 1, wherein the information relating to the packet includes information selected from the group consisting of:

a network address associated with the packet;
a uniform resource locator (URL) associated with the packet;
a network protocol associated with the packet;
a query string associated with the packet;
a port associated with the packet;
a file type associated with the packet;
a timestamp of the packet; and
at least a portion of a payload of the packet.

13. The computer-implemented method of claim 12, wherein the information relating to the packet further includes information selected from the group consisting of:

a user identifier of associated with the packet; and
a device identifier of the network device associated with the packet.

14. The computer-implemented method of claim 1, wherein the network device is coupled to the network access device on a first network, and wherein the method includes providing the network device with access to a second network.

15. The computer-implemented method of claim 1, wherein the method includes transmitting the information relating to the packet to a server.

16. The computer-implemented method of claim 1, wherein the method includes receiving updated logging rules from a server.

17. The computer-implemented method of claim 1, wherein the network device is a multi-user device and the network access device applies distinct first and second logging rules for distinct first and second users of the multi-user device.

18. The computer-implemented method of claim 1, wherein a respective logging rule is selected from the group consisting of:

a rule indicating that information related to packets from a user that has opted into storing information related to packets are to be stored;

a rule indicating that information related to packets from a network device that has been opted into storing information related to packets are to be stored;

a rule indicating that information related to packets associated with a file having a predetermined file type are to be stored;

a rule indicating that information related to packets associated with a file having a file type that is not an excluded file type are to be stored;

a rule indicating that information related to packets directed to a predetermined port are to be stored;

a rule indicating that information related to packets directed to a port that is not an excluded port are to be stored; and a predefined logical combination of two or more of said rules.

19. A non-transitory computer readable storage medium storing one or more programs configured for execution by one or more processors of a server system, the one or more programs comprising instructions for:

receiving, at the network access device, a packet for a network device coupled to the network access device by a local area network;

obtaining an indicia corresponding to a presumptive user of the network device, the presumptive user comprising a member of a set of known users of the network access device;

applying, at the network access device, one or more logging rules to the packet for the network device, the one or more applied logging rules corresponding to the obtained indicia; and storing information relating to the packet in accordance with a determination, at the network access device, that the packet satisfies at least one of the logging rules applied to the packet for the network device.

20. The non-transitory computer readable storage medium of claim 19, wherein the one or more programs include instructions for preventing information relating to the packet from being stored when the one or more logging rules applied to the network device are not satisfied.

21. The non-transitory computer readable storage medium of claim 19, wherein the one or more programs include instructions for preventing information relating to the packet from being stored when the one or more logging rules applied to the network device specify that information corresponding to the packet are not to be stored.

22. The non-transitory computer readable storage medium of claim 19, wherein the instructions for obtaining the indicia corresponding to the presumptive user of the network device include, with respect to a single-user device comprising the network device, instructions for:
   obtaining a device identifier for the network device; and
   obtaining the indicia corresponding to a user of the network device that is associated with the device identifier.

23. The non-transitory computer readable storage medium of claim 19, wherein the instructions for obtaining the indicia corresponding to the presumptive user of the network device include, with respect to a multi-user device comprising the network device, instructions for:
   determining that a previous association between a user and the network device has expired;
   in accordance with the determination, redirecting the network device to a self-identification page, the self-identification page requesting a user of the network device to provide the indicia corresponding to the presumptive user of the network device; and
   responsive to the redirecting, receiving, from the user of the network device, the indicia corresponding to the presumptive user of the network device.

24. The non-transitory computer readable storage medium of claim 19, wherein the instructions for obtaining the indicia corresponding to the presumptive user of the network device include, with respect to a multi-user device comprising the network device, instructions for:
   determining that a previous association between a user and the network device has not expired; and
   obtaining the indicia of the user that was previously associated with the network device.

25. The non-transitory computer readable storage medium of claim 19, wherein the one or more programs further include instructions for:
   receiving a second packet for a second network device coupled to the network access device;
   determining that the second network device is not known to the network access device; and
   redirecting the second network device to a self-identification page, the self-identification page requesting a user of the second network device to provide a second indicia corresponding to a second presumptive user of the second network device.

26. A system to track network traffic of users in a research panel, comprising:
   one or more processors; and
   memory storing one or more programs for execution by the one or more processors, the one or more programs including instructions for:
      receiving, at the network access device, a packet for a network device coupled to the network access device by a local area network;
      obtaining an indicia corresponding to a presumptive user of the network device, the presumptive user comprising a member of a set of known users of the network access device;
      applying, at the network access device, one or more logging rules to the packet for the network device, the one or more applied logging rules corresponding to the obtained indicia; and
      storing information relating to the packet in accordance with a determination, at the network access device, that the packet satisfies at least one of the logging rules applied to the packet for the network device.

27. A computer-implemented method for tracking network traffic of users in a research panel, performed on a network access device having at least one processor and memory storing at least one program for execution by the at least one processor to perform the method, comprising:
   receiving packets for a plurality of network devices coupled to the network access device, the plurality of network devices including one or more single-user devices including at least a first single-user device associated with a registered user, and a multi-user device;
   in conjunction with a respective packet for the multi-user device, obtaining an indicia corresponding to a member of a set of known users;
   for the respective packet for the multi-user device, applying one or more logging rules corresponding to the obtained indicia;
   in conjunction with a respective packet for a respective single-user device, applying one or more respective logging rules for the respective single-user device, wherein the applied one or more respective logging rules correspond to a respective user associated with the respective single-user device; and
   storing information relating to each received packet when the received packet satisfies the one or more logging rules applied to the corresponding network device.

28. The computer-implemented method of claim 27, wherein the method includes, for a respective received packet for a respective network device, preventing information relating to the respective received packet from being stored when the logging rule applied to the respective network device is not satisfied.

29. The computer-implemented method of claim 27, wherein the method includes, for a respective received packet for a respective network device, preventing information relating to the respective received packet from being stored when the logging rule applied to the respective network device specifies that information corresponding to the respective received packet is not to be stored.

* * * * *